United States Patent [19]

Greenhalgh et al.

[11] 3,995,994
[45] Dec. 7, 1976

[54] DISPERSE DYESTUFF MIXTURES

[75] Inventors: Colin William Greenhalgh; Ronald Wynford Kenyon; Andrew John Logan, all of Blackley, England

[73] Assignee: Imperial Chemical Industries Limited, London, England

[22] Filed: July 28, 1975

[21] Appl. No.: 599,346

[30] Foreign Application Priority Data

July 31, 1976 United Kingdom ............ 33700/76

[52] U.S. Cl. .................................. 8/26; 8/39 C; 8/41 C; 8/179
[51] Int. Cl.$^2$ ............... C09B 27/00; C09B 45/48
[58] Field of Search ........................................ 8/26

[56] References Cited

UNITED STATES PATENTS

| 3,413,075 | 11/1968 | Rotcop et al. ............... 8/26 |
| 3,942,946 | 3/1976 | Okaniwa et al. ............ 8/26 |
| 3,958,287 | 5/1975 | Okaniwa et al. ............ 8/26 |

*Primary Examiner*—Joseph L. Schofer
*Assistant Examiner*—A. L. Clingman
*Attorney, Agent, or Firm*—Cushman, Darby & Cushman

[57] ABSTRACT

A process to color aromatic polyester textiles navy blue to black by dyeing, padding or printing with an aqueous dispersion of mixtures of four specified azo and anthraquinone disperse dyes.

3 Claims, No Drawings

DISPERSE DYESTUFF MIXTURES

This invention relates to mixtures of disperse dyestuffs and to their use for colouring aromatic polyester textile materials.

According to the invention there is provided a process for the colouration of aromatic polyester textile materials which comprises applying to the said textile material by a dyeing, padding or printing process an aqueous dispersion of a dyestuff mixture consisting of:

a. from 2% to 60% by weight (based on the total weight of dyestuffs in the mixture) of a water-insoluble monoazo dyestuff, free from sulphonic acid and carboxylic acid groups, which is of the formula:

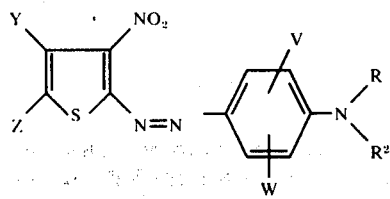

Formula I wherein Y represents hydrogen, nitro, lower alkyl or optionally substituted phenyl; Z is lower alkyl, optionally substituted phenyl, nitro, cyano, optionally substituted lower alkoxycarbonyl or carbonamido; V is hydrogen, chlorine, optionally substituted alkyl or optionally substituted alkoxy; W is hydrogen, chlorine, bromine, optionally substituted alkyl, optionally substituted alkoxy, optionally substituted alkylthio, lower alkoxycarbonyl, carbonamido, sulphonamido, lower alkylcarbonyl, lower alkylsulphonyl, lower alkylsulphonyloxy, cyano, trifluoromethyl, lower alkylcarbonyloxy, benzoyloxy, lower alkylsulphonylamino, or sulphamato; $R^1$ and $R^2$ each independently represent a hydrogen atom or an optionally substituted alkyl, cycloalkyl, phenyl or heterocyclic radical or $R^1$ and $R^2$ together form with the nitrogen atom N a 5- or 6-membered nitrogen-containing heterocyclic ring, or $R^1$ may be joined together with V when it is in ortho position to the amino group to form a 6-membered nitrogen-containing heterocyclic ring, or V and W when they are in ortho position to each other may be joined together to form a group of 4 carbon atoms so as to form a naphthalene ring;

b. from 40% to 95% by weight (based on the total weight of dyestuffs in the mixture) of (i) at least one disperse anthraquinone dyestuff of the formula:

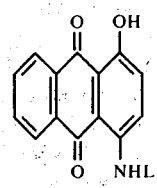

Formula II which can contain up to 30% of its own weight of a disperse anthraquinone dyestuff of the formula:

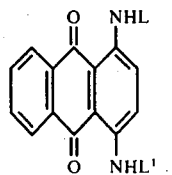

Formula III wherein L and $L^1$ each independently represent a phenyl radical which can be substituted by one or more chlorine or bromine atoms or by hydroxy, amino, lower alkyl, lower alkoxy, hydroxyloweralkoxy, N-lower alkylamino, acylamino, N:N-di(lower alkyl) amino, carbo lower alkoxy, lower alkoxycarbonyloxy or lower alkylcarbonyloxy groups; and c. from 0 to 50% by weight (based on the total weight of dyestuffs present in the mixture) of at least one yellow to red disperse dyestuff.

The process of the invention may be conveniently carried out by immersing the aromatic polyester textile material in a dyebath comprising an aqueous dispersion of a dyestuff mixture as hereinbefore defined, the dispersion being stabilised, if desired, by dispersing agents, for example non-ionic dispersing agents, cationic dispersing agents as anionic dispersing agents or a mixture of two or more such dispersing agents. Dyeing is then carried out at the temperature usually employed for applying disperse dyestuffs to such textile materials. Thus the dyeing process can either be carried out at a temperature between 90° and 100° C, preferably in the presence of a carrier such as diphenyl or o-hydroxydiphenyl, or at a temperature above 100° C preferably at a temperature between 120° and 140° C under superatmospheric pressure when a carrier is not necessary.

Alternatively an aqueous dispersion of a said dyestuff mixture can be padded onto the aromatic polyester textile material, and the dyestuffs are then fixed on the textile material by steaming it for short periods at temperatures between 100° and 180° C. or by baking it at temperatures between 160° and 220° C. If desired the padding liquor can contain the conventional additives, for example dispersing agents, thickeners, migration inhibitors, or urea.

As a further alternative a thickened printing paste containing the dyestuff mixture in dispersed form can be applied to the surface of the aromatic polyester textile material by any of the methods conventionally used for applying printing pastes to aromatic polyester textile materials, for example by block, screen or roller printing. The printed textile material, optionally after being dried, is then steamed for short periods at temperatures between 100° and 180° C, or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

At the conclusion of the process the coloured textile material is preferably rinsed in water and/or given a treatment in an aqueous solution of soap or a synthetic detergent before being dried. It is however preferred to subject the coloured textile material to a treatment in an alkaline aqueous solution of sodium hydrosulphite before the soaping treatment in order to remove loosely attached dyestuff from the surface of the textile material.

It is preferred that the amount of the dyestuff of Formula I present in the said mixture is from 5% to 20% by weight (based on the total weight of dyestuffs present in the mixture), and also that the amount of the yellow to red disperse dyestuff does not exceed 25% by weight (based on the total weight of dyestuffs in the mixture).

It is further preferred that in the dyestuff of Formula I

Z is cyano or preferably nitro;
Y is hydrogen;
V is hydrogen, lower alkyl or lower alkoxy
W is hydrogen, lower alkyl or lower alkoxy,
and $R^1$ and $R^2$ are each independently hydrogen or an optionally substituted lower alkyl radical.

Throughout this Specification the terms "lower alkyl" and "lower alkoxy" are used to denote alkyl and alkoxy radicals respectively containing from 1 to 4 carbon atoms.

As examples of the lower alkyl radicals represented by Y and Z there may be mentioned methyl, ethyl, n-propyl and n-butyl.

As examples of the substituted phenyl radicals represented by Y and Z there may be mentioned tolyl, anisyl, chlorophenyl, bromophenyl, nitrotolyl and nitrophenyl. As examples of the lower alkoxycarbonyl radicals represented by Z and W there may be mentioned methoxycarbonyl, ethoxycarbonyl and n-butyloxycarbonyl. As examples of the substituted lower alkoxycarbonyl radicals represented by Z there may be mentioned hydroxy lower alkoxycarbonyl such as β-hydroxyethoxycarbonyl, lower alkoxy lower alkoxycarbonyl such as β-(methoxy- or ethoxy-)ethoxycarbonyl, cyano lower alkoxycarbonyl such as β-cyanoethoxycarbonyl, and chloro lower alkoxycarbonyl such as β-chloroethoxycarbonyl.

The carbonamido groups represented by Z and W are of the formula

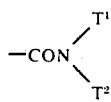

wherein $T^1$ is hydrogen, lower alkyl or phenyl and $T^2$ is hydrogen or lower alkyl; and as examples of the said groups there may be mentioned carbonamido itself and N-methyl and N:N-diethylcarbonamido.

The optionally substituted alkyl radicals represented by V and W are preferably optionally substituted lower alkyl radicals, and as specific examples of such radicals there may be mentioned methyl, ethyl, propyl and butyl, hydroxy lower alkyl such as β-hydroxyethyl, lower alkoxy lower alkyl such as methoxymethyl, and lower alkoxycarbonyl lower alkyl such as methoxycarbonylmethyl. The optionally substituted alkoxy radicals represented by V and W are preferably optionally substituted lower alkoxy radicals, and as examples of such radicals there may be mentioned methoxy and ethoxy, hydroxy lower alkoxy such as β-hydroxyethoxy, lower alkoxycarbonyl lower alkoxy such as ethoxycarbonylmethyoxy. As examples of the optionally substituted lower alkylthio radicals represented by W there may be mentioned methylthio, ethylthio and lower alkoxycarbonyl lower alkylthio such as ethoxycarbonylmethylthio. As examples of the lower alkylcarbonyl and lower alkylsulphonyl radicals represented by W there may be mentioned acetyl, propionyl, methylsulphonyl and ethylsulphonyl. As examples of the lower alkylcarbonyloxy radicals represented by W there may be mentioned acetyloxy and propionyloxy. The sulphonamido radicals represented by W are of the formula

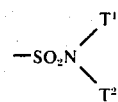

wherein $T^1$ and $T^2$ have the meanings stated, such as sulphonamido, N-methylsulphonamido, N:N-diethylsulphonamido and sulphonanilido. The sulphamate radicals represented by W are of the formula methylsulphonylamino.

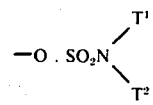

wherein $T^1$ and $T^2$ have the meanings stated, such as N-methylsulphamato and N:N-diethylsulphamato. As examples of the lower alkylsulphonyloxy and lower alkylsulphonylamino radicals represented by W there may be mentioned ethylsulphonyloxy and methylsulphonylamino The optionally substituted alkyl radicals represented by $R^1$ and $R^2$ are preferably optionally substituted lower alkyl radicals, and as examples of such radicals there may be mentioned methyl, ethyl, propyl and butyl, hydroxy lower alkyl such as β-hydroxyethyl, β:γ-dihydroxypropyl and ω-hydroxybutyl, cyano lower alkyl such as β-cyanoethyl, chloro lower alkyl such as β-chloroethyl and β- or γ-chloropropyl, lower alkoxy lower alkyl such as β-(methoxy- or ethoxy-)ethyl, γ-methoxypropyl and ω-ethoxybutyl, lower alkylcarbonyloxy lower alkyl such as β-acetoxyethyl and ω-acetoxybutyl, phenyl lower alkyl such as benzyl and β-phenylethyl, lower alkoxy lower alkoxy lower alkyl such as β-(β'-methoxyethoxy)ethyl, hydroxy lower alkoxy lower alkyl such as β-(β'-hydroxyethoxy)ethyl, lower alkoxycarbonyloweralkyl such as β-methoxycarbonylethyl, β-ethoxycarbonylethyl and γ-methoxycarbonylpropyl and hydroxy, lower alkoxy, cyano, lower alkoxy lower alkoxy, hydroxy lower alkoxy and lower alkyl carbonyloxy derivatives thereof such as β-(β'-hydroxyethoxycarbonyl)ethyl, β-(β'-methoxyethoxycarbonyl)ethyl, β-(β'-cyanoethoxycarbonyl)ethyl and β-(β'-acetoxyethoxycarbonyl)ethyl radicals. As examples of the substituted phenyl radicals represented by $R^1$ and $R^2$ there may be mentioned tolyl, anisyl, chlorophenyl and bromophenyl. As examples of the optionally substituted heterocyclic radicals represented by $R^1$ and $R^2$ there may be mentioned 2- or 4-pyridyl.

As examples of the 5- or 6- membered nitrogen-containing heterocyclic rings formed by joining together $R^1$, $R^2$ and the nitrogen atom N there may be mentioned pyridine, pyrrolidine, piperidine and morpholine rings.

The said dyestuffs of Formula I can be obtained by diazotising an amine of the formula:

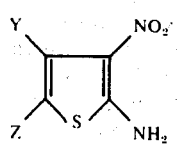

and coupling the resulting diazo compound with a coupling component of the formula:

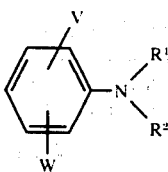

wherein Y, Z, V, W, R¹ and R² have the meanings stated, the amine and coupling component being free from carboxylic and sulphonic acid groups, the said reactions being carried out by conventional methods.

As examples of the said substituents which are optionally present on the phenyl radicals represented by L and L¹ there may be mentioned methyl, ethyl, methoxy, ethoxy, β-hydroxyethoxy, propoxy, butoxy, methylamino, dimethylamino, diethylamino, carbomethoxy, carboethoxy, methoxycarbonyloxy, acetyloxy, formylamino, acetylamino, propionylamino and benzoylamino.

The dyestuffs of Formula II can themselves be obtained, for example, by the condensation of a mixture of quinizarin and leucoquinizarin with an arylamine of the formula L-NH$_2$, wherein L has the meaning stated above, in the presence of boric acid and a liquid such as water and/or a water miscible organic liquid. Whilst the initial condensation product (i.e., Formula II) is obtained, some bis-condensation usually occurs so that the product comprises a mixture of the dyestuffs of Formulae II and III. However, the reaction is carried out under such conditions that the formation of the dyestuff of Formula III is kept to a minimum and in no event exceeds 30%, and in fact is preferably less than 20%, by weight of the dyestuff of Formula II.

The yellow to red disperse dyestuffs which can be present in the dyestuff mixtures of the invention can be any of the yellow to red disperse dyestuffs which are conventionally employed in dyeing aromatic polyester textile materials and the shades of which fall within the areas 1 to 9 inclusive of the Hue Indication Chart in the third edition of the Colour Index which was published by The Society of Dyers and Colourists in 1971. Such dyestuffs are described in, for example, the third edition of the Colour Index or in British Specifications Nos. 1,256,093, 1,256,355 and 1,256,714.

According to a further feature of the invention there is provided a dyestuff mixture comprising
a. from 2% to 60% by weight (based on the total weight of dyestuffs in the mixture) of a disperse azo dyestuff of Formula I,
b. from 40% to 95% by weight (based on the total weight of dyestuffs in the mixture) of a disperse anthraquinone dyestuff of Formula II which can contain up to 30% of its own weight of a disperse anthraquinone dyestuff of Formula III,
c. from 0 to 50% by weight (based on the total weight of dyestuffs in the mixture) of at least one yellow to red disperse dyestuff, and
d. optionally a diluent.

The dyestuff mixtures of the invention can be obtained by simply mixing the various components together in the required proportions. Since, however, the said mixtures are to be used for dyeing aromatic polyester textile materials from aqueous dyebaths the mixtures generally contain in addition one or more of the diluents, especially dispersing agents, which are conventionally employed in preparing commercially available forms of disperse dyestuffs. Such mixtures can be obtained by milling or grinding together the various dyestuff components in the stated proportions optionally in the presence of one or more diluents and, if desired, in the presence of water and subsequently removing the water from the resulting dispersion and/or standardising the mixture by the addition of conventional diluents such as dispersing agents, de-dusting agents and/or water-soluble organic liquids.

By the process of the invention aromatic polyester textile materials are coloured in blue to black shades possessing excellent fastness to light and to wet treatments such as perspiration. The said dyestuff mixtures have excellent build up properties on such textile materials, enabling heavy depths of shade to be readily obtained.

The invention is illustrated but not limited by the following Examples in which the parts and percentages are by weight.

EXAMPLE 1

100 Parts of a woven polyethylene terephthalate textile material are immersed in a dyebath comprising a dispersion of 2 parts of the dyestuff mixture, obtained as described below, in 3000 parts of water containing 1 part of the disodium salt of bis (2-sulphonaphth-1-yl) methane and 1 part of the sodium salt of a sulphated ceytl/oleyl/ alcohol mixture, and dyeing is then carried out for 1 hour at 130° C under superatmospheric pressure. The dyed textile material is then removed from the dyebath, rinsed in water, treated for 15 minutes at 50° C in an aqueous solution containing 0.2% of sodium hydroxide and 0.2% of sodium hydrosulphite, rinsed in water, "soaped" for 10 minutes in a 0.2% aqueous solution of a synthetic detergent at 100° C., rinsed again in water and is finally dried.

The textile material is thereby dyed a navy blue shade having excellent fastness to light.

The dyestuff mixture used in the above Example was obtained by intimately mixing together 0.3 part of the dyestuff obtained by coupling diazotised 2-amino-3:5-dinitrothiophene onto N:N-di(β-acetoxyethyl)-m-toluidine, and 1.7 parts of a 85:15 mixture of 1-hydroxy-4-anilino anthraquinone and 1:4-dianilinoanthraquinone. This mixture of anthraquinone compounds was itself obtained by heating a mixture of 81 parts of quinizarin, 27 parts of leucoquinizarin, 63 parts of aniline, 54 parts of boric acid, 378 parts of ethanol and 126 parts of water for 12 hours at the boil cooling to 15° C, and filtering off the precipitated solid which was washed with aqueous alcohol, then with a 1% aqueous solution of sodium hydroxide, and finally water, and dried.

EXAMPLE 2

In place of the 2 parts of the dyestuff mixture used in Example 1 there are used 2 parts of the dyestuff mixture obtained by mixing together 1.7 parts of the 85:15 mixture of 1-hydroxy-4-anilinoanthraquinone and 1:4-di(anilino)anthraquinone used in Example 1 and 0.3 parts of the dyestuff obtained by coupling diazotised 2-amino-3:5-dinitrothiophene onto N:N-di(β-n-butyroxyethyl) aniline. A navy blue dyeing of good light fastness is obtained.

EXAMPLE 3

In place of the 1.7 parts of the mixed anthraquinone dyestuff used in Example 1 there are used 1.7 parts of a 85:15 mixture of 1-hydroxy-4-[p-(β-hydroxyethoxy)anilino]anthraquinone and 1:4-di[p-(β-hydroxyethoxy)anilino]anthraquinone whereby a navy blue dyeing of good heat and light fastness is obtained.

The mixture of anthraquinone compounds used in this Example was itself obtained by heating a mixture of 7.68 parts of quinizarin, 1.94 parts of leucoquinizarin, 7.35 parts of β-(p-aminophenoxy)ethanol, 5.4 parts of boric acid 24 parts of ethanol and 15 parts of water for 11 hours at 85° C, cooling to 15° C, and filtering off the precipitated solid which was washed with aqueous alcohol, then with a 1 % aqueous solution of sodium hydroxide, and finally water, and dried.

EXAMPLE 4

In place of the 1.7 parts of the mixed anthraquinone dyestuff used in Example 1 there are used 1.7 parts of a 85:15 mixture of 1-hydroxy-4-(p-methoxyanilino)anthraquinone and 1:4-di(p-methoxyanilino)anthraquinone when a navy blue dyeing of good light fastness is obtained.

The mixed anthraquinone dyestuff used in this Example was itself obtained by the method described in the last paragraph of Example 1 except that the 63 parts of aniline were replaced by 84 parts of p-anisidine.

EXAMPLE 5

In place of the 1.7 parts of the mixed anthraquinone dyestuff used in Example 1 there are used 1.7 parts of the mixed anthraquinone dyestuff obtained as described below whereby a navy blue dyeing of good light fastness is obtained.

The mixed anthraquinone dyestuff used in this Example was prepared by heating a mixture of 7.68 parts of quinizarin, 1.92 parts of leucoquinizarin, 5.4 parts of boric acid, 3.94 parts of p-anisidine, 3.94 parts of m-aminophenol and 90 parts of ethanol for 16 hours at the boil. The mixture was cooled and the precipitated solid filtered off, washed with water and dried The product consisted essentially of a 60:28:10:2 mixture of 1-hydroxy-4-(p-anisidino)anthraquinone, 1-hydroxy-4-(m-hydroxyanilino) anthraquinone, 1:4-di(p-anisidino)anthraquinone and 1:4-di(m-hydroxyanilino)anthraquinone.

In place of the mixed anthraquinone dyestuff used in this Example there are used the mixed anthraquinone dyestuffs which are similarly obtained by replacing the mixture of p-anisidine and m-aminophenol used above by mixtures of:
a. aniline and p-toluidine
b. p-anisidine and p-toluidine
c. aniline and p-anisidine
d. m-aminophenol and p-aminophenol when similar navy blue dyeings are obtained.

Example 6

In place of the 0.3 parts of the azo dyestuff used in any of Examples 1 and 3 to 5 above there is used 0.3 part of any of the following azo dyestuffs when similar navy blue dyeings are obtained:

a. by coupling diazotised 2-amino-3:5-dinitrothiophene onto N-ethyl-N-(β-hydroxyethyl)aniline,
b. by coupling diazotised 2-amino-3:5-dinitrothiophene onto N-ethyl-N-(β-methoxycarbonylethyl)aniline,
c. by coupling diazotised 2-amino-3:5-dinitrothiophene onto N:N-di(β-methoxyethyl)-m-toluidine,
d. by coupling diazotised 2-amino-3:5-dinitrothiophene onto N:N-di(β-hydroxyethyl)-m-toluidine,
e. by coupling diazotised 2-amino-3:5-dinitrothiphene onto N-ethyl-N-[β-(β'-methoxypropionyloxy)ethyl]-m-toluidine,
f. by coupling diazotised 2-amino-3:5-dinitrothiophene onto N-ethyl-N-(ω-hydroxybutyl)-m-toluidine,
g. by coupling diazotized 2-amino-3:5-dinitrothiophene onto N-methyl-N-(ω-acetoxybutyl)aniline.

EXAMPLE 7

In place of the 2 parts of the dyestuff mixture used in Example 1 there are used 4 parts of a dyestuff mixture obtained by mixing together 1.90 parts of a 85:15 mixture of 1-hydroxy-4-anilinoanthraquinone and 1:4-dianilinoanthraquinone, 0.34 part of the azo dyestuff obtained by coupling diazotised 2-amino-3:5-dinitrothiophene onto N:N-di(β-hydroxyethyl)-m-toluidine, 0.98 part of 4-(p-nitrophenylazo)diphenylamine (C.I. Disperse Orange 1) and 0.78 part of 2:4-dinitro-4'-hydroxydiphenylamine (C.I. Disperse Yellow 1) whereby a black dyeing of good fastness properties is obtained.

We claim:
1. Process for the colouration of aromatic polyester textile materials which comprises applying to the said textile material by a dyeing, padding or printing process an aqueous dispersion of a dyestuff mixture consisting of:
a. from 2% to 60% by weight (based on the total weight of dyestuffs in the mixture) of a water-insoluble monoazo dyestuff, free from sulphonic acid and carboxylic acid groups, which is of the formula:

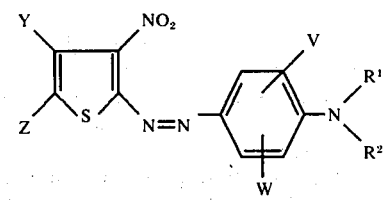

Formula I wherein Y represents hydrogen, nitro, lower alkyl or optionally substituted phenyl;
Z is lower alkyl optionally substituted phenyl, nitro, cyano, optionally substituted lower alkoxycarbonyl or carbonamido; V is hydrogen, chlorine, optionally substituted alkyl or optionally substituted alkoxy;
W is hydrogen, chlorine, bromine, optionally substituted alkyl, optionally sub-stituted alkoxy, optionally substituted alkylthio, lower alkoxycarbonyl, carbonamido, sulphonamido, lower alkylcarbonyl, lower alkylsulphonyl, lower alkylsulphonyloxy, cyano, trifluoromethyl, lower alkylcarbonyloxy, benzoyloxy, lower alkylsulphonylamino, or sulphamato;
$R^1$ and $R^2$ each independently represent a hydrogen atom or an optionally substituted alkyl, cycloalkyl, phenyl or heterocyclic radical or $R^1$ and R² together form with the nitrogen atom N a 5- or 6-membered nitrogen-containing heterocyclic ring, or R¹ may be joined together with V when it is in ortho position to the amino group to form a 6-membered nitrogen-containing heterocyclic ring, or V and W when they are in ortho position to each other may be joined together to form a group of 4 carbon atoms so as to form a naphthalene ring;

b. from 40% to 95% by weight (based on the total weight of dyestuffs in the mixture) of (i) at least one disperse anthraquinone dyestuff of the formula:

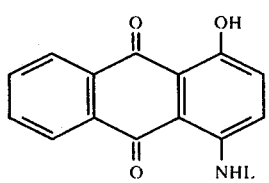

Formula II which can contain up to 30% of its own weight of a disperse anthraquinone dyestuff of the formula:

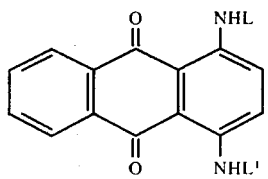

Formula III wherein L and L¹ each independently represent a phenyl radical which can be substituted by one or more chlorine or bromine atoms or by hydroxy, amino, lower alkyl, lower alkoxy, hydroxylower-alkoxy, N-lower alkylamino, acylamino, N:N-di(lower alkyl)amino, carbo lower alkoxy, lower alkoxycarbonyloxy or lower alkylcarbonyloxy groups; and from 0 to 50% by weight (based on the total weight of dyestuffs present in the mixture) of at least one yellow to red disperse dyestuff as hereinbefore defined.

2. Process as claimed in claim 1 wherein the quantity of the yellow to red disperse dyestuff does not exceed 25% by weight, based on the total weight of dyestuffs in the mixture.

3. Process as claimed in claim 1 wherein in the azo dyestuff of Formula I, Z is cyano or nitro, Y is hydrogen, V and W are each independently hydrogen, lower alkyl or lower alkoxy, and R¹ and R² are each independently hydrogen or an optionally substituted lower alkyl radical.

* * * * *

UNITED STATES PATENT OFFICE
CERTIFICATE OF CORRECTION

Patent No. 3,995,994     Dated December 7, 1976

Inventor(s) Colin William Greenhalgh; Ronald Wynford Kenyon; Andrew John Logan

It is certified that error appears in the above-identified patent and that said Letters Patent are hereby corrected as shown below:

In Item [30]

Foreign Application Priority Data should read:

--July 31, 1974   United Kingdom   33700/74--

Signed and Sealed this

Fifth Day of April 1977

[SEAL]

Attest:

RUTH C. MASON
*Attesting Officer*

C. MARSHALL DANN
*Commissioner of Patents and Trademarks*